much of the page is standard patent cover sheet (12) United States Patent  
Kraus et al.

(10) Patent No.: US 7,780,214 B2
(45) Date of Patent: Aug. 24, 2010

(54) WINDSHIELD WIPER, ESPECIALLY FOR A MOTOR VEHICLE

(75) Inventors: Achim Kraus, Buehl (DE); Gerard Albrecht, Hatten (FR); Roland Bohn, Buehl (DE); Francois Schabanel, Saint Maux des Fosses (FR); Guenther Friderichs, Rheinmunster (DE); Didier Pierron, Lingolsheim (FR)

(73) Assignee: Robert Bosch GmbH, Stuttgart (DE)

( * ) Notice: Subject to any disclaimer, the term of this patent is extended or adjusted under 35 U.S.C. 154(b) by 895 days.

(21) Appl. No.: 11/547,657

(22) PCT Filed: Feb. 14, 2005

(86) PCT No.: PCT/EP2005/050643

§ 371 (c)(1),
(2), (4) Date: Oct. 5, 2006

(87) PCT Pub. No.: WO2005/097565

PCT Pub. Date: Oct. 20, 2005

(65) Prior Publication Data

US 2008/0189896 A1    Aug. 14, 2008

(30) Foreign Application Priority Data

Apr. 6, 2004    (DE)    ........................ 10 2004 016 810

(51) Int. Cl.
*B60S 1/04*    (2006.01)
(52) U.S. Cl. .................................. 296/96.15; 296/96.17
(58) Field of Classification Search ............... 296/96.15, 296/96.17; 15/250.3, 250.31
See application file for complete search history.

(56) References Cited

U.S. PATENT DOCUMENTS 5,507,585 A * 4/1996 Diederich et al. ............ 403/349
5,706,547 A * 1/1998 Kobayashi .................. 15/250.3
6,027,157 A * 2/2000 Epple ....................... 296/96.15

(Continued)

FOREIGN PATENT DOCUMENTS

DE    198 33 404    1/2000

(Continued)

*Primary Examiner*—Glenn Dayoan
*Assistant Examiner*—Gregory Blankenship
(74) *Attorney, Agent, or Firm*—Michael Best & Friedrich LLP (57) ABSTRACT

The invention starts with a windshield wiper device (10), in particular for a motor vehicle, with at least one drive element (16) that can be fastened to the vehicle body (26) and that has a driven shaft (28) and at least two axially rigid fastening elements (22), which engage in receiving openings (24) on the vehicle body (26) and are provided with at least one damping element (76, 90, 96) for damping mechanical vibrations. It is proposed that the damping elements (76, 90, 96) are fastening blocks made of a rubber-elastic material and are fastened to the drive element (16), that said damping elements are provided with slots (78) and are arranged in such a manner that they can be inserted in a first assembly direction (64) in the receiving openings (24) and prompted by a movement in a second assembly direction (32) transverse to the first direction the damping elements reach across the first edge (88) of the receiving opening (24) with a slot (78), and that a locking element (30, 52, 66, 80, 92, 98) secures the final position in the second assembly direction (32).

17 Claims, 5 Drawing Sheets

U.S. PATENT DOCUMENTS

| | | |
|---|---|---|
| 6,869,126 B2* | 3/2005 | Schmid et al. ............ 296/96.15 |
| 6,899,370 B2* | 5/2005 | Kalchschmidt et al. .. 296/96.15 |
| 6,902,221 B2* | 6/2005 | Egner-Walter et al. ... 296/96.17 |
| 7,246,840 B2* | 7/2007 | Gates et al. ................. 296/106 |
| 7,353,561 B2* | 4/2008 | Morin et al. ............. 15/250.31 |
| 7,503,615 B2* | 3/2009 | Albrecht et al. .......... 296/96.15 |
| 2004/0084308 A1 | 5/2004 | Cole et al. |
| 2005/0017533 A1* | 1/2005 | Egner-Walter et al. ... 296/96.15 |
| 2007/0011839 A1* | 1/2007 | Princet et al. ............ 15/250.31 |
| 2008/0052863 A1* | 3/2008 | Albrecht et al. .......... 15/250.31 |
| 2008/0216275 A1* | 9/2008 | Collinet et al. ........... 15/250.31 |
| 2008/0230299 A1* | 9/2008 | Volz et al. .................... 180/311 |

FOREIGN PATENT DOCUMENTS

| | | |
|---|---|---|
| DE | 100 62 617 | 5/2002 |
| WO | WO 00/06429 | 2/2000 |
| WO | WO 03/051690 | 6/2003 |
| WO | WO 2004/089707 | 10/2004 |

\* cited by examiner

WINDSHIELD WIPER, ESPECIALLY FOR A MOTOR VEHICLE

BACKGROUND OF THE INVENTION

The invention starts with a windshield wiper device, in particular for a motor vehicle.

Numerous windshield wiper devices for motor vehicles that have a drive element, which is fastened to the vehicle body, are already known. Typically, these types of drive element are permanently screwed onto the vehicle body, which, however, is very expensive and requires a lot of parts like screws, screw nuts and washers, etc. This is logistically expensive as well as complex in terms of installation. In addition, a windshield wiper device is known from DE 100 62 617 A1, which is glued in place in the motor vehicle, wherein the adhesive features damping properties.

A windshield wiper system for vehicles, in particular motor vehicles, is known from DE 198 33 404 A1, which makes screw-free and thus simple and quick assembly possible. For this purpose, the windshield wiper device has a support construction for a drive device. Provided on the supporting structure is a number of first fastening elements, which project out from the supporting structure in a first direction. Projecting in a second direction, which runs at an angle between 45 and 135° to the first angle, preferably at an angle of 90°, are a number of second fastening elements. The fastening elements are embodied as cylindrical plug pins, which are connected to the supporting structure with one end and with their free end are inserted into a receiving opening of a rubber-elastic damping element. This damping element is inserted into an assembly opening of the vehicle body. The assembly opening can be situated in an angled or deep-drawn bracket, which is welded onto the vehicle body. The free end of the plug pin can preferably have a conical thickening in order to fix said plug pin in the damping element by locking. Since the assembly directions of the first and second fastening elements run under one angle, this does not preclude the supporting structure from being under tension after assembly, which is transferred to adjacent parts of the vehicle body.

SUMMARY OF THE INVENTION

According to the invention, the damping elements are dampening blocks made of a rubber-elastic material. They are fastened on the drive element and are arranged in such a manner that they can be inserted in a first assembly direction in the receiving openings and prompted by a movement in a second assembly direction transverse to the first direction the damping elements reach across the first edge of the receiving opening with slots. The slots of all fastening blocks and the receiving openings lie in a plane or in planes, which are offset parallel to one another in the first assembly direction. The fastening blocks with their slots hold the drive element securely in the receiving openings, while a locking element secures the final position of the fastening blocks in the second assembly direction and thereby prevents the fastening blocks from being able to move back after assembly in the second assembly direction and disengaging. The receiving opening can be formed directly by an opening in the body panel or in a holder, which is mounted on the body panel, e.g., welded.

The second assembly movement runs in a plane transverse to the first assembly direction. So that the driven shaft of the drive element essentially remains in its position during this movement, it is expedient if it also runs in the first assembly direction and the fastening elements are arranged essentially on tangents of a circle or concentric circles around the driven shaft or an axis essentially parallel to this. The movement in the second assembly direction is then a rotational movement around the driven shaft or the parallel axis.

The locking element is a longish bolt in cross section, which has a damping layer on its circumference. In ari assembled state it is inserted into an elongated hole in the drive element and in an assembly opening of the vehicle body. The elongated hole and the assembly opening extend transverse to the second assembly direction, i.e., essentially radially to the driven shaft if the movement in the second assembly direction is a rotational movement around the driven shaft. The damping layer in the second assembly direction is adjacent to the edges of the elongated hole or the assembly opening so that in an assembled state the drive element is vibrationally isolated from the vehicle body and fixed in this position. Play can be provided for tolerance compensation in the direction transverse to the second assembly direction.

The damping layer is composed of a rubber-elastic material, which is sprayed on a harder basis material of the locking element, or can be mounted, clipped and, if necessary, otherwise fastened as an independent component.

In accordance with an embodiment of the invention, it is proposed that the locking element in an assembled state is adjacent on one end with a flange on the drive element and gradually tapers towards its other end so that larger cross section adjacent to the flange is inserted in the elongated hole, while a narrower end engages in an assembly opening of the vehicle body. The step is adjacent on the front side to the edge of the assembly opening in the vehicle opening. This makes sure that the drive element is at a secure distance from the vehicle body in the area of the locking element, and the danger of an acoustic bridge is avoided. In this case, the damping layer can cover the basis material of the locking element towards the outside both in the area of the elongated hole as well as in the area of the assembly opening. But it suffices if the layer is only provided on the locking element in the area of the assembly opening and provides for vibrational isolation, while, in the area of the elongated hole, the locking element with the basis material, which is expediently a suitable solid plastic, is directly adjacent to the edges of the elongated hole. The end with the narrower cross section is coated by the damping layer, which preferably features two bulges. As a result, the locking element is held in the assembly opening of the vehicle body according to a type of clip connection and the vehicle body panel is covered on the front side in the edge area of the assembly opening. The bulges can be formed advantageously by thickenings of the basis material of the locking element. The thickenings simultaneously provide for a secure fit of the damping layer.

In another embodiment of the invention, the locking element has a spring clip closed in the first assembly direction, which has an inner and outer damping layer and engages with the closed end in the assembly opening of the vehicle body. On the open end, the spring clip is connected via angled legs with the drive element. With the spring clip the legs form such an angle that they press the spring clip together during assembly of the drive element in the first assembly direction and the inner damping layers are adjacent to one another. In the second assembly direction, the outer damping layers are pressed on the edge of the assembly opening. The closed end can form a bulge, which locks with the edge of the assembly opening.

While, as a rule, several fastening elements are required, one locking element suffices for a windshield wiper device. It can be arranged separately from the fastening elements. According to one embodiment of the invention, the locking element is advantageously combined with a fastening element, in that in an assembled state on the side of the fastening element that lies in the rear as viewed in the second assembly direction bridges the intermediate space between a fastening block and the edge of the receiving opening. Components are saved and/or simplified as a result.

In principle, the locking element can be a separate component that is essentially inflexible and is inserted into the intermediate space. In this case, the elastic fastening block yields. The locking element is expediently attached to the fastening block. According to an embodiment of the invention, it is proposed that the locking element be embodied as a locking block, which is arranged in the first assembly direction in an offset manner relative to the fastening block and can be displaced as soon as the fastening block has reached its final position. The locking block can be connected to the fastening block via shear ribs, which either yield elastically, tear off or break off during assembly, if the locking block is displaced relative to the fastening block. In another embodiment, the locking block is connected to the fastening block via a longitudinal guide, e.g., a dovetail guide.

During assembly, the locking block is arranged in the first assembly direction offset from the fastening block so that it can be inserted into the receiving opening and be moved in the second assembly direction. As soon as the final position is reached, the locking block is displaced in the first assembly direction by the displacement distance so that it now fills up the intermediate space in the receiving opening. So that the locking block cannot detach from the receiving opening, it is expediently locked on the edge of the receiving opening via locking elements.

Another possibility consists of the locking element being a bar that is flexible towards the first assembly direction. During the first part of assembly, the bar yields against the first assembly direction and engages in the receiving opening with a locking hook at the end of the second assembly movement of the fastening block. The bar expediently has a limit stop on its free end, which in an assembled state is adjacent to an edge of the receiving opening and limits the locking movement. In an assembled state, the bar runs approximately parallel to the receiving opening. As a result, the bar is stressed essentially in the longitudinal direction, wherein the bending moments and collapsing forces are low.

BRIEF DESCRIPTION OF THE DRAWINGS

Additional advantages are yielded from the following description of the drawings. Exemplary embodiments of the invention are depicted in the drawings. The drawings, the description and the claims contain numerous features in combination. The person skilled in the art will also observe individual features expediently and combine them into additional, meaningful combinations.

The drawings show.

DETAILED DESCRIPTION

Figure 1:
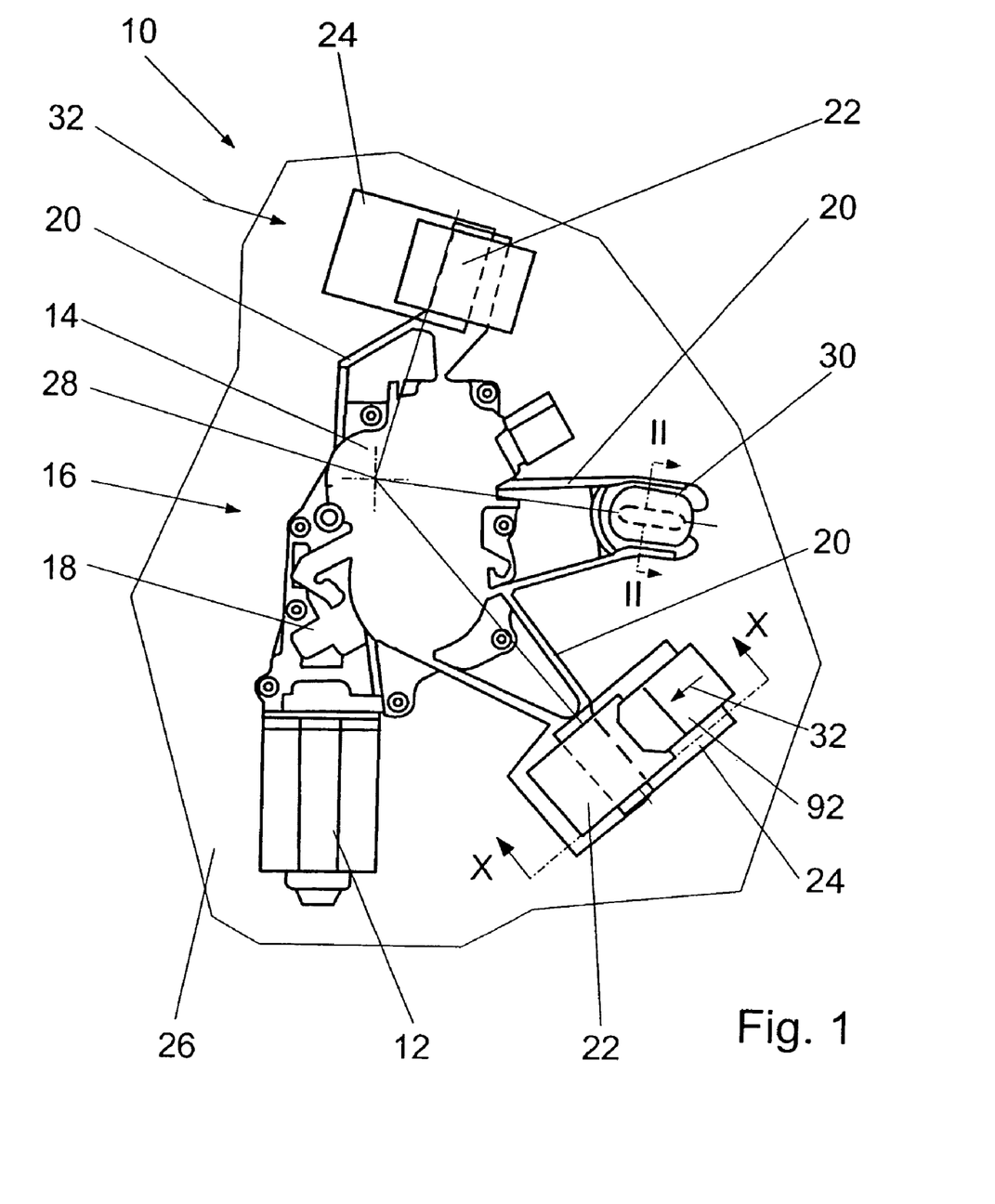
FIG. 1 A schematic depiction of a drive device of a windshield wiper device in accordance with the invention.

FIG. 1 shows a schematic depiction of a windshield wiper device 10 of a rear windshield wiper of a motor vehicle. Naturally, the invention is in no way restricted to rear windshield wipers. It can be used without difficulty for front windshield wipers. The windshield wiper device 10 comprises an electric motor 12 with a gear mechanism 14, which together form a drive unit 16. The drive element 16 features a housing 18, which is partially made of cast material and has fastening arms 20. Fastening elements 22 are arranged on the ends of two fastening arms 20, while a locking element 30 is provided on the end of another fastening arm 20.

Figure 8:
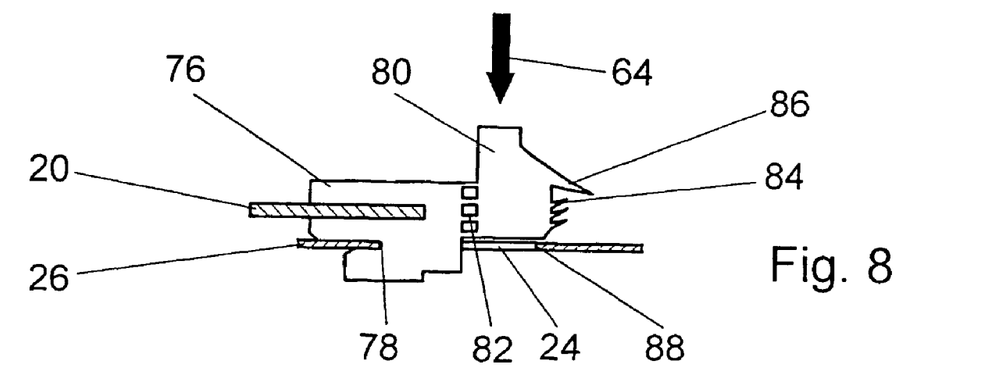
FIG. 8 A fastening element with a fastening block and locking block in a half assembled state.
Figure 10:
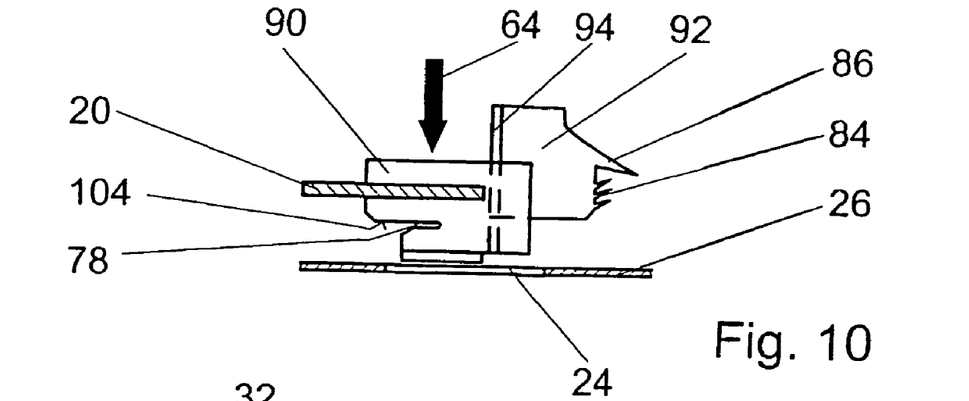
FIG. 10 to FIG. 13 A variation of FIG. 8 and FIG. 9 in various assembly steps.
Figure 11:
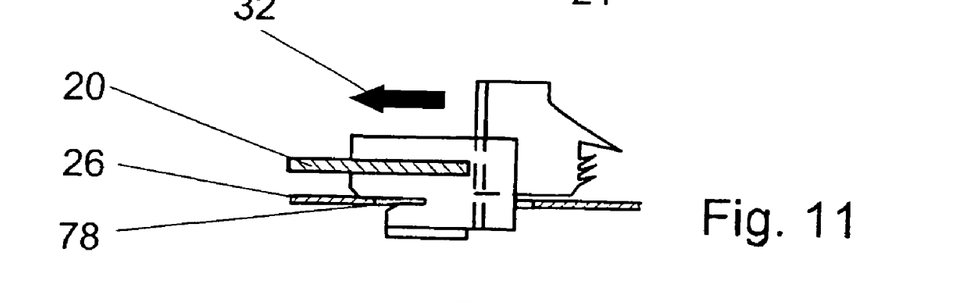
Figure 12:
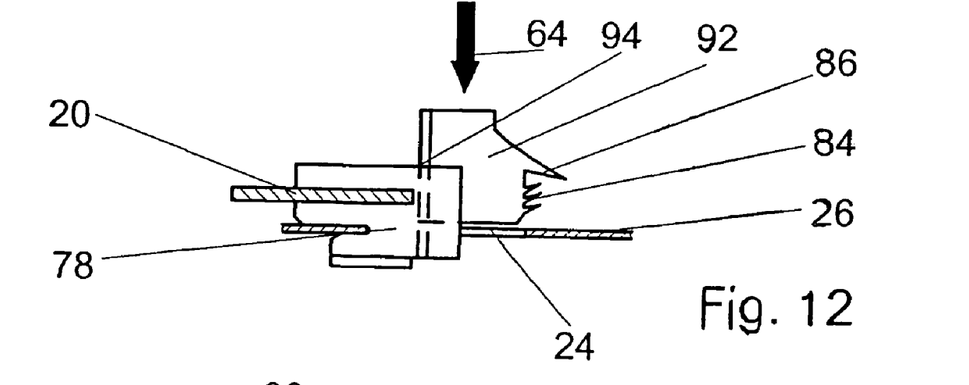
Figure 13:
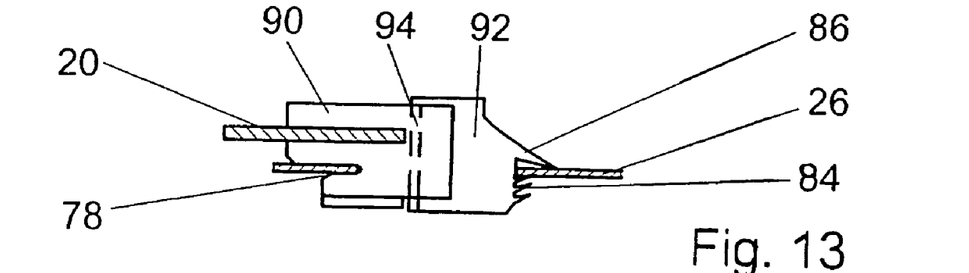

The fastening elements 22 are essentially comprised of a fastening block 76 (FIG. 8), 90 (FIG. 10), 96 (FIG. 14), which is fastened to the respective fastening arm 20, and is manufactured of a vibration-damping, rubber-elastic material. Receiving openings 24 are provided for the fastening elements 22 on a body 26 of the vehicle. As a rule, these are openings in the body panel or in a holding device that is permanently connected to the body panel.

The receiving openings 24 lie in a plane transverse to a first assembly direction 64. They can also be arranged distributed to several planes running parallel to one another. The fastening blocks 76, 90, 96 are inserted in the receiving openings 24 in the first assembly direction 64 and then moved transverse to this in a second assembly direction 32, wherein a slot 78 reaches across the vehicle body 26 on the edge of the assembly opening 24. The first assembly direction 64 expediently lies axially parallel to a driven shaft 28 of the drive element 16. The second assembly direction 32 can then be a rotational movement around the driven shaft 28, wherein the receiving openings 24 and the fastening blocks 76, 90, 96 with their slots 78 lie tangentially to circles around the driven shaft 28. With such an arrangement, the alignment and position of the driven shaft 28 is essentially retained during assembly, and the opening for the driven shaft 28 in the vehicle body 26 can be sealed simply.

After the fastening blocks 76, 90, 96 have reached their final position in the second assembly direction 32; this position is fixed by a locking element 30, 52, 66, 92, 98. Only one locking element 30, 52, 66, 92, 98 is required for a windshield wiper device. FIG. 1 depicts a locking element 30, which is arranged independent of the fastening element 22, and a locking element in the form a locking block 92, which is used in combination the fastening element 22. All locking elements 30, 52, 66, 92, 98 can be used individually or in combination with one another.

Figure 2:
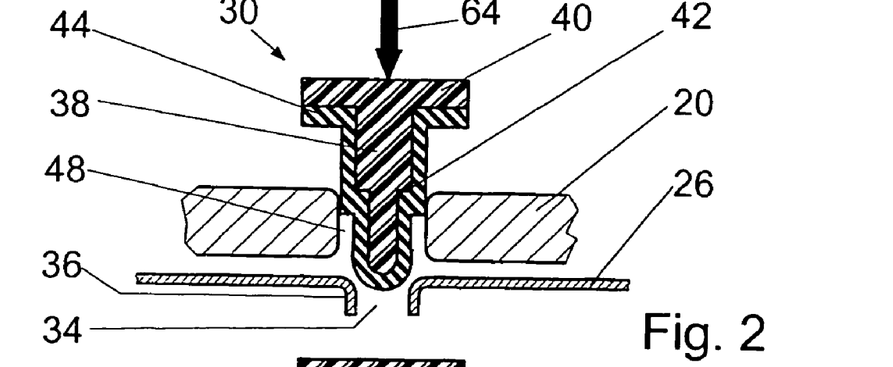
FIG. 2 A longitudinal section through a locking element of a drive device corresponding to Line II-II in FIG. 1 during assembly.
Figure 3:
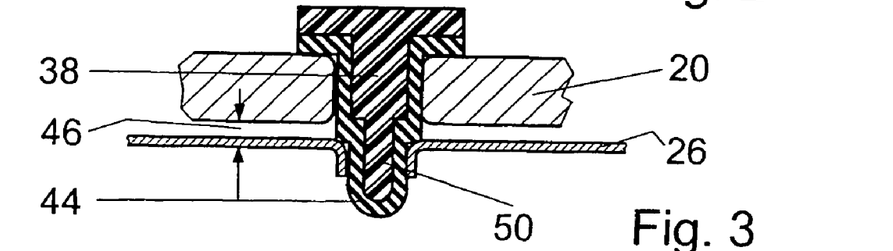
FIG. 3 A section corresponding to FIG. 2 in an assembled state of the locking element.

The locking element 30 (FIG. 2) has a core 38 made of solid material, e.g., plastic. It has a longish cross section, which in the embodiment according to FIG. 1 is aligned radially to the driven shaft 28. The locking element 30 has a flange 40 to support it on the fastening arm 20 in an assembled state. Adjacent to the flange 40 towards the body 26 is a stepped part, whose larger cross section is inserted into elongated hole 48 of the fastening arm 20 and whose end 50 with a smaller cross section is inserted into an assembly opening 34 of the vehicle body 26. The edges of the opening 34 of the vehicle body 26 are beaded into a collar 36 in the first assembly direction 64. The core 38 of the locking element 30 is surrounded from the end 50 with the smaller cross section to the flange 40 with a vibration-damping layer 44 so that the fastening arm 20 is vibrationally isolated from the vehicle body 26. The layer 44 can be sprayed on the core 38 or be formed by a separate component, which is slid over the more solid core 38. Since the more solid core 38 has a step 42 in the first assembly direction 64, the layer 44 is also correspondingly stepped so that the step in an assembled state (FIG. 3) is adjacent to the edge of the assembly opening 34 and secures a distance 46 between the fastening arm 20 and the body 26.

Figure 4:
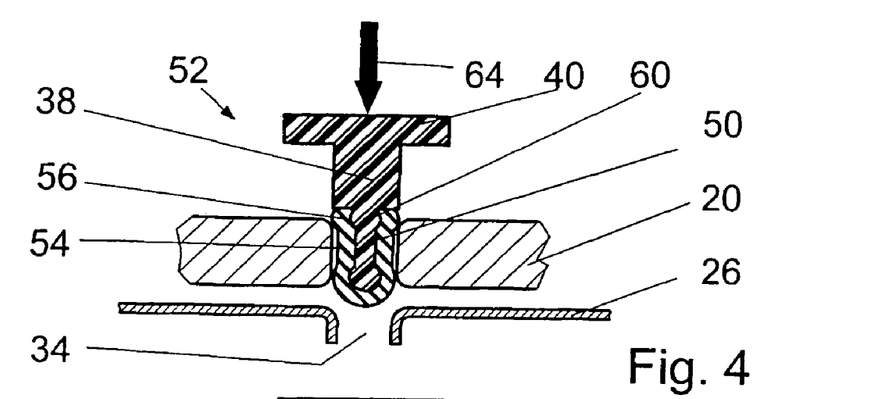
FIG. 4 and FIG. 5 A variation of FIG. 2 and FIG. 3.
Figure 5:
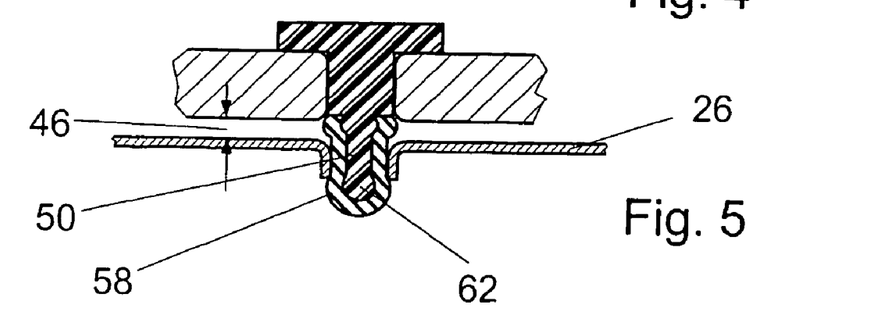

The locking element 52 in accordance with FIG. 4 and FIG. 5 is designed similar to the locking element 30. However, in this case the larger cross section of the core 38 is directly adjacent to the elongated hole 48 without a vibration-damping layer, while the vibration-damping layer 54 extends only into the area of the step 42. The end 50 with the reduced cross section has a thickening 60 in the area of the step 42 and a thickening 62 towards the outside. The thickenings 60, 62 cause the vibration-damping layer 54 to form bulges 56, 58 in these areas. The distance between the bulges 56, 58 is dimensioned so that the locking element 52 clips into the assembly opening 34 of the vehicle body 26 and guarantees an adequate distance 46 between the vehicle body 26 and the fastening arm 20. In addition, the thickenings 60, 62 secure a solid fit of the vibration-damping layer 54, even if this is embodied as a separated component.

Figure 6:
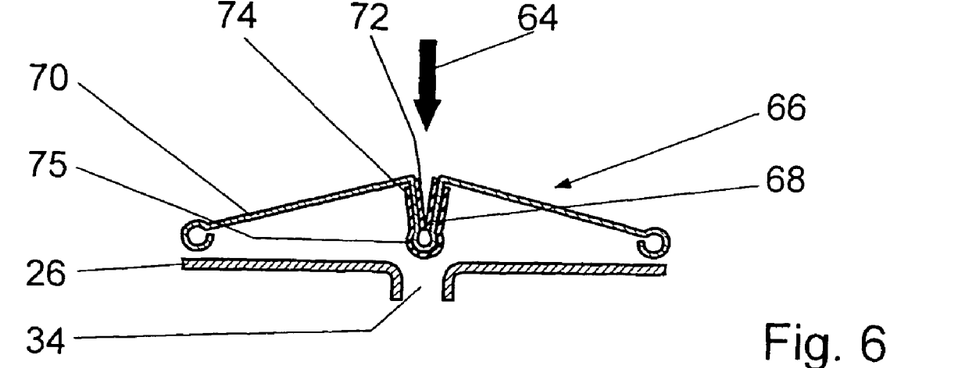
FIG. 6 and FIG. 7 A variation of FIG. 2 and FIG. 3.
Figure 7:
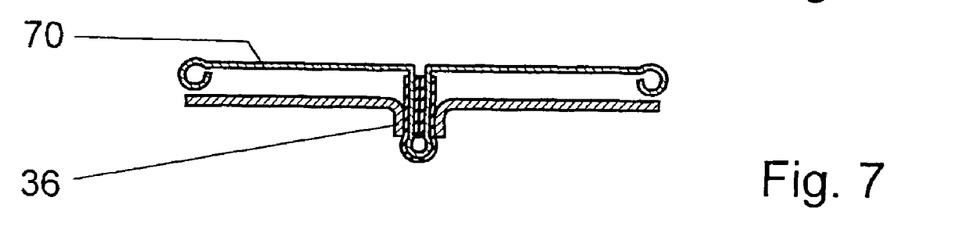

The locking element 66 in accordance with FIG. 6 and FIG. 7 has a spring clip 68 with a bent end 75. Adjacent to the free ends of the spring clip 68 are angled legs 70, which are connected to the fastening arm 20 in a manner not shown in more detail. The spring clip 68 has a vibration-damping layer 72 on the inside and a vibration-dampening layer 74 on the outside, which surround the bent end 75. This end is thickened as compared with the assembly opening 34 so that the locking element 66 locks into place on the collar 36 of the assembly opening 34. During assembly of the locking element 66 in the first assembly direction 64, the legs 70 go into an extended position, wherein they press the spring clip 68 together and the press the inner vibration-damping layers 72 against each other.

Figure 9:
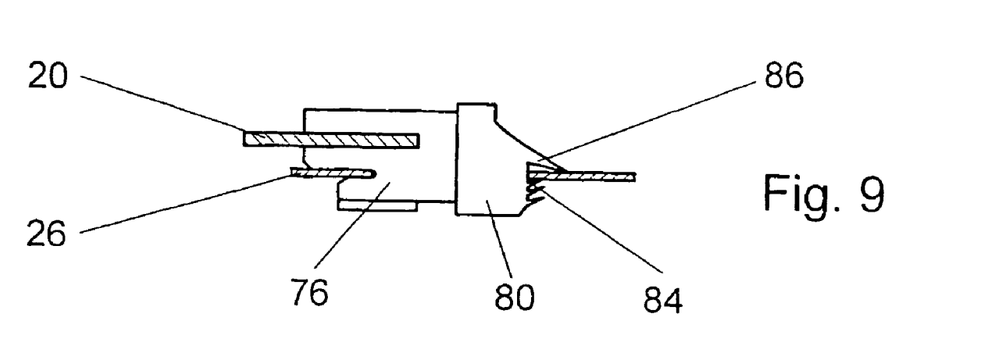
FIG. 9 A fastening element according to FIG. 8 in an assembled state.

In the case of the embodiments in FIG. 8 through FIG. 16, the locking elements 80, 92, 98 are combined with the fastening element 76, 90, and 96. In the embodiment in FIG. 8 and FIG. 9, the locking element embodied as a locking block 80 is connected to the fastening block 76 via shear ribs 82, and namely offset by such an amount vis-á-vis the first assembly direction 64 that first the fastening block 76, which is fastened on the fastening arm 20, is inserted into the assembly opening 24 and can be displaced in the second assembly direction 32 so that the slot 78 can surround the body 26 on the edge of the assembly opening 24. In this position, the locking block 80 is pushed into the assembly opening 24 in the first assembly direction 64, wherein the shear ribs 82 tear off, break off or deform elastically so much that the locking block 80 can fill up the intermediate space between the fastening block 76 and an edge 88 of the receiving opening 24 (FIG. 9). In doing so the locking block is held and secured on the edge 88 by a limit stop 86 and locking hooks 84.

FIG. 10 through FIG. 13 show a similar embodiment. In this case, a locking block 92 is displaceably guided in the first assembly direction 64 into a fastening block 90 via a longitudinal guide 94. The fastening block 90 is fastened on the fastening arm 20 and has a slot 78. In a first assembly step (FIG. 11), the fastening block 90 is inserted into the assembly opening 24 until the upper flank 104 of the slot 78 is adjacent to the side facing the body 26. In a further step of the procedure, the fastening block 90 with the locking block 92 is rotated in the second assembly direction 32 until the final position (FIG. 12) is reached and the slot 78 surrounds the body 26 on the edge of the receiving opening 24. In another assembly step, the locking block 92 is displaced in the longitudinal guide 94 in the first assembly direction 64 until the limit stop 86 is adjacent to the body 26 and one of the locking hooks 84 secures the position of the opposite side of the vehicle body 26.

Figure 14:
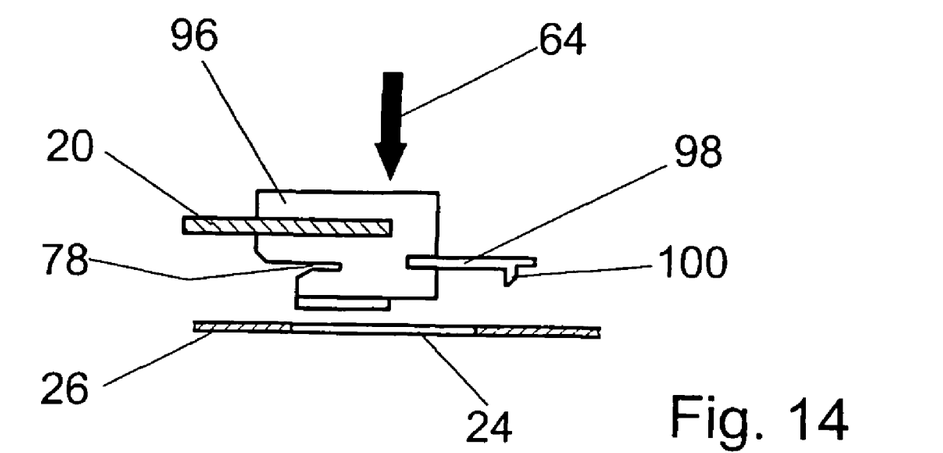
FIG. 14 to FIG. 16 A variation of FIG. 8 and FIG. 9 in various assembly steps.
Figure 15:
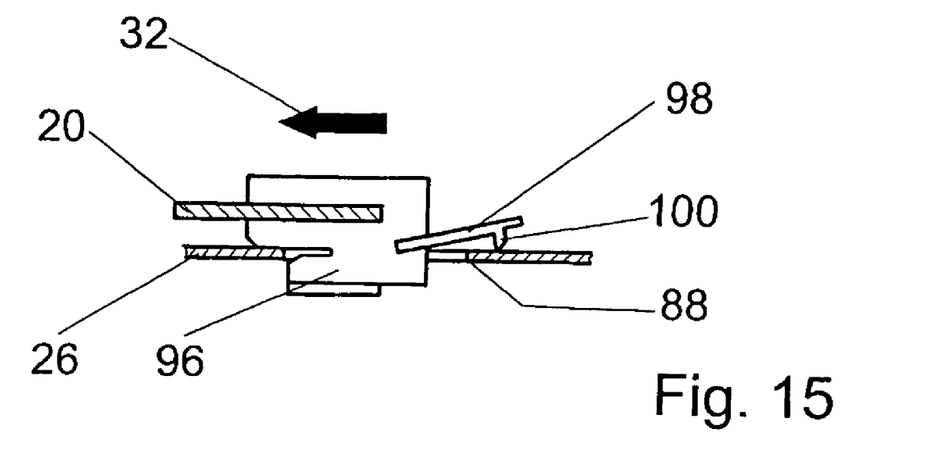
Figure 16:
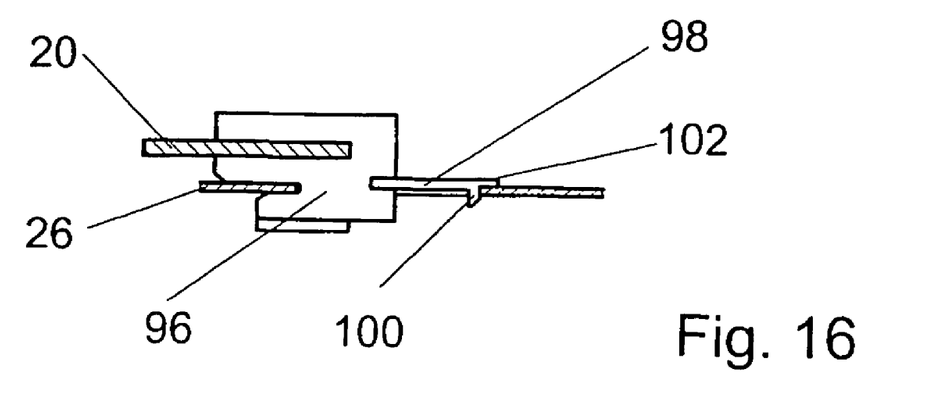

In the embodiment in FIG. 14 through FIG. 16, a bar 98 serves as the locking element, which bar is arranged so that it is flexible towards the first assembly direction 64 on the side of the fastening block 96 facing away from the slot 78. In this case, the bar 98 can be permanently inserted in the fastening block 96 made of elastic material and the resiliency can be brought about by the elasticity of the fastening block 96. Another possibility is that the bar 98 itself have sufficient elasticity in the first assembly direction 64 or be connected in an articulated manner to the fastening block 96. The fastening block 96 is inserted into the receiving opening 24 of the vehicle body 26 in a first assembly step in the first assembly direction 64 until the upper flank 104 of the slot 78 is adjacent to the side facing the vehicle body 26. In doing so, the bar 98, which is adjacent to the vehicle body 26 with an angled locking hook 100, yields towards the first assembly direction 64. In a further assembly step in the second assembly direction, the edge of the assembly opening 24 is slid into the slot 78. If the fastening block reaches its final position in the second assembly direction 32 (FIG. 16), the bar 98 snaps into the receiving opening 24 with a locking hook 100, wherein a limit stop 102 on the free end of the bar 98 ends up adjacent to the vehicle body 26. In this position, the bar 98 bridges the distance between the fastening block 96 and the edge 88 of the receiving opening 24. In this case, it is expedient that the bar 98 lies in a plane as near as possible to the receiving opening 24 so that the bar 98 is not stressed in the longitudinal direction by any appreciable bending moments.

The invention claimed is:

1. Windshield wiper device (10), for a motor vehicle, with at least one drive element (16) that can be fastened to the vehicle body (26) and that has a driven shaft (28) and at least two axially rigid fastening elements (22), which engage in receiving openings (24) on the vehicle body (26) and are provided with at least one damping element (76, 90, 96) for damping mechanical vibrations, characterized in that the damping elements (76, 90, 96) are fastening blocks made of a rubber-elastic material and are fastened to the drive element (16), that said damping elements are provided with slots (78) and are arranged in such a manner that they can be inserted in a first assembly direction (64) in the receiving openings (24) and prompted by a movement in a second assembly direction (32) transverse to the first direction the damping elements reach across the first edge (88) of the receiving opening (24) with a slot (78), and that a locking element (30, 52, 66, 80, 92, 98) secures the final position in the second assembly direction (32).

2. Windshield wiper device according to claim 1, characterized in that the flank (104) of the slot (78), which flank lies in the rear in the first assembly direction, (64) projects further than the other flank in the second assembly direction (32) and forms a limit stop.

3. Windshield wiper device (10) according to claim 1, characterized in that the fastening elements (22) are each arranged essentially on tangents of a circle around the driven shaft (28) or an axis essentially parallel to this shaft and the movement in the second assembly direction (32) is a rotational movement around the driven shaft (28) or the axis.

4. Windshield wiper device (10) according to claim 1, characterized in that the locking element (30, 52) is a bolt which has a damping layer (44, 54) on its circumference and in an assembled state grips through an elongated hole (48) in the drive element (16) and an assembly opening (34) of the vehicle body (26), wherein the elongated hole (48) and the assembly opening (34) extend transverse to the second assembly direction (32).

5. Windshield wiper device (10) according to claim 4, characterized in that the locking element (30, 52) in an assembled state is adjacent on one end with a flange (40) on the drive element (16) and gradually tapers towards its other end (50) so that a step (42) is adjacent to the edge of the assembly opening (34).

6. Windshield wiper device (10) according to claim 4, characterized in that the damping layer (54) of the locking element (52) extends only from the free end to the step (42) and has bulges (56, 58) on its ends.

7. Windshield wiper device (10) according to claim 6, characterized in that the bulges (56, 58) are formed by thickenings (60, 62) of the basis material of the locking element (52).

8. Windshield wiper device (10) according to claim 1, characterized in that the locking element (66) has a spring clip (68), which is connected via angled legs (70) on its free ends to the drive element (16), wherein the spring clip (68) has an inner and outer damping layer (72, 74) and is pressed together during assembly in the first assembly direction (64) by the legs (70).

9. Windshield wiper device (10) according to claim 8, characterized in that the spring clip (68) has a thickening on its bent end (75), with which it locks on the edge (36) of the assembly opening (34) of the vehicle body (26).

10. Windshield wiper device (10) according to claim 1, characterized in that the locking element (80, 92, 98) is combined with a fastening element (22) and in an assembled state on its side that lies in the rear as viewed in the second assembly direction (32) bridges the intermediate space between the fastening block (76, 90, 96) and the receiving opening (24).

11. Windshield wiper device (10) according to claim 10, characterized in that the locking element is embodied as a locking block (80, 92), which can be displaced in the first assembly direction (64) relative to the fastening block (76, 90).

12. Windshield wiper device (10) according to claim 11, characterized in that the locking block (80) is connected to the fastening block (76) via shear ribs (82).

13. Windshield wiper device (10) according to claim 10, characterized in that the locking block (92) is connected to the fastening block (90) via a longitudinal guide (94).

14. Windshield wiper device (10) according to claim 11, characterized in that the locking block (80, 92) has locking elements (84, 86) towards the edge (88) of the receiving opening (24).

15. Windshield wiper device (10) according to claim 10, characterized in that the locking element (98) is a bar (98) that is flexible towards the first assembly direction (64), which locks into the receiving openings (24) with a locking hook (100) at the end of the second assembly movement (32).

16. Windshield wiper device (10) according to claim 15, characterized in that the bar (98) has a limit stop (102) on its free end and in an assembled state runs approximately parallel to the receiving opening (24).

17. Windshield wiper device (10) according to claim 1, characterized in that the basis material of the locking element (30, 52, 66, 80, 92, 98) is a largely inflexible plastic.

* * * * *